(12) United States Patent
Cheung

(10) Patent No.: US 10,694,317 B2
(45) Date of Patent: Jun. 23, 2020

(54) METHODS, SYSTEMS, AND APPARATUS FOR A GEO-FENCE SYSTEM

(71) Applicant: eBay Inc., San Jose, CA (US)

(72) Inventor: Dennis Cheung, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/951,416

(22) Filed: Apr. 12, 2018

(65) Prior Publication Data

US 2018/0234794 A1    Aug. 16, 2018

Related U.S. Application Data

(63) Continuation of application No. 15/070,178, filed on Mar. 15, 2016, now Pat. No. 9,967,706, which is a continuation of application No. 14/098,111, filed on Dec. 5, 2013, now Pat. No. 9,307,359.

(51) Int. Cl.
*H04W 24/00* (2009.01)
*H04W 4/021* (2018.01)
*G06Q 30/02* (2012.01)

(52) U.S. Cl.
CPC ........ *H04W 4/021* (2013.01); *G06Q 30/0205* (2013.01); *G06Q 30/0241* (2013.01); *H04W 4/022* (2013.01); *G06Q 30/0201* (2013.01); *Y02P 80/15* (2015.11)

(58) Field of Classification Search
USPC .............................. 705/16, 26.1; 340/539.13
See application file for complete search history.

(56) References Cited

U.S. PATENT DOCUMENTS

| 6,581,546 | B1 | 6/2003 | Dalland et al. |
| 6,665,613 | B2 | 12/2003 | Duvall |
| 8,018,329 | B2 | 9/2011 | Morgan et al. |
| 8,331,236 | B2 | 12/2012 | Cavalli et al. |
| 9,137,636 | B2* | 9/2015 | Sheha ................... G01C 21/20 |
| 9,307,359 | B2* | 4/2016 | Cheung ................ H04W 4/021 |
| 9,439,122 | B2 | 9/2016 | Bakker et al. |
| 9,967,706 | B2 | 5/2018 | Cheung |
| 2006/0193280 | A1 | 8/2006 | Lee et al. |
| 2007/0077929 | A1 | 4/2007 | Chen et al. |
| 2007/0232311 | A1 | 10/2007 | Kuhn et al. |

(Continued)

FOREIGN PATENT DOCUMENTS

| AU | 2014360332 B2 | 7/2016 |
| AU | 2016101804 A4 | 11/2016 |

(Continued)

OTHER PUBLICATIONS

"European Application Serial No. 14867705.7, Summons to Attend Oral Proceedings mailed Nov. 2, 2018", 10 pgs.

(Continued)

*Primary Examiner* — David Q Nguyen
(74) *Attorney, Agent, or Firm* — Schwegman Lundberg & Woessner, P.A.

(57) ABSTRACT

Methods, systems, and apparatus for defining, generating, utilizing, and/or detecting a geo-fence are described. A trigger is obtained, the trigger generated in response to a change in a geo-fence criteria. One or more boundaries of the geo-fence based on the geo-fence criteria are defined in response to obtaining the trigger.

17 Claims, 6 Drawing Sheets

(56) References Cited

U.S. PATENT DOCUMENTS

| | | | |
|---|---|---|---|
| 2010/0003610 | A1 | 1/2010 | Barcelo et al. |
| 2012/0172027 | A1 | 7/2012 | Partheesh et al. |
| 2012/0231773 | A1 | 9/2012 | Lipovski |
| 2012/0310527 | A1 | 12/2012 | Yariv et al. |
| 2013/0030391 | A1 | 1/2013 | Baid |
| 2013/0030931 | A1* | 1/2013 | Moshfeghi ............ G01S 19/48 705/16 |
| 2013/0099977 | A1 | 4/2013 | Sheshadri et al. |
| 2013/0212065 | A1 | 8/2013 | Rahnama |
| 2013/0246175 | A1 | 9/2013 | Bilange et al. |
| 2014/0279123 | A1* | 9/2014 | Harkey .................. H04L 67/18 705/26.1 |
| 2015/0095157 | A1* | 4/2015 | McDevitt ........... G06Q 30/0261 705/14.58 |
| 2015/0095355 | A1 | 4/2015 | Patton |
| 2015/0163629 | A1 | 6/2015 | Cheung |
| 2016/0198298 | A1 | 3/2016 | Cheung et al. |

FOREIGN PATENT DOCUMENTS

| | | |
|---|---|---|
| CN | 105934650 B | 12/2014 |
| CN | 105934650 A | 9/2016 |
| CN | 107396317 A | 11/2017 |
| KR | 10-1832798 B1 | 2/2018 |
| WO | 2015/085176 A1 | 6/2015 |

OTHER PUBLICATIONS

"European Application Serial No. 14867705.7, Response filed Sep. 26, 2018 to Communication Pursuant to Article 94(3) EPC dated May 31, 2018", 10 pgs.
Response to Summons to Attend Oral Proceedings filed on Mar. 19, 2019, for European Patent Application No. 14867705.7, mailed on Nov. 2, 2018, 9 pages.
Response to Summons to Attend Oral Proceedings filed on Feb. 21, 2019, for European Patent Application No. 14867705.7, mailed on Nov. 2, 2018, 12 pages.
Decision to Refuse received for European Patent Application No. 14867705.7, dated Apr. 17, 2019, 14 pages.
312 Amendment filed for U.S. Appl. No. 14/098,111, filed Feb. 24, 2016, 6 pages.
Applicant Initiated Interview Summary received for U.S. Appl. No. 14/098,111, dated Jun. 12, 2015, 4 pages.
Applicant Initiated Interview Summary received for U.S. Appl. No. 14/098,111, dated Nov. 4, 2015, 3 pages.
Final Office Action received for U.S. Appl. No. 14/098,111, dated Sep. 9, 2015, 8 pages.
Non-Final Office Action received for U.S. Appl. No. 14/098,111, dated May 12, 2015, 13 pages.
Notice of Allowance received for U.S. Appl. No. 14/098,111, dated Nov. 24, 2015, 15 pages.
PTO Response to Rule 312 Amendment for U.S. Appl. No. 14/098,111, dated Mar. 3, 2016, 2 pages.
Response to Final Office Action filed on Nov. 9, 2015 for U.S. Appl. No. 14/098,111, dated Sep. 9, 2015, 11 pages.
Response to Non-Final Office Action filed on Aug. 11, 2015 for U.S. Appl. No. 14/098,111, dated May 12, 2015, 9 pages.
Communication Pursuant to Article 94(3) EPC received for European Patent Application No. 14867705.7, dated Jul. 21, 2017, 17 pages.
Communication pursuant to Rule 164(1) EPC received for European Patent Application No. 14867705.7, dated Apr. 18, 2017, 9 pages.
Extended European Search Report received for European Patent Application No. 14867705.7, dated Jul. 7, 2017, 7 pages.
Invitation pursuant to Rule 63(1) EPC received for European Patent Application No. 14867705.7, dated Jan. 11, 2017, 3 pages.
International Search Report received for PCT Patent Application No. PCT/US2014/068803, dated Mar. 10, 2015, 2 pages.
Written Opinion received for PCT Patent Application No. PCT/US2014/068803, dated Mar. 10, 2015, 6 pages.
International Preliminary Report on Patentability received for PCT Application No. PCT/US2014/068803, dated Jun. 16, 2016, 8 pages.
Office Action received for Korean Patent Application No. 10-2016-7017866, dated Aug. 24, 2016, 5 pages with English Translation of Claims.
Notice of Acceptance received for Australian Patent Application No. 2014360332, dated Jun. 30, 2016, 2 pages.
Response to Office Action filed on Sep. 2, 2019, for Korean Patent Application No. 10-2019-7006730, dated Jul. 1, 2019, 12 pages (3 pages of English Translation and 9 Pages of Official Copy).
Office Action received for Korean Patent Application No. 10-2019-7006730, dated Jul. 1, 2019, 8 pages (4 pages official copy and 4 pages English translation).
Notice of Allowance received for Korean Patent Application No. 10-2016-7017866, dated Dec. 2, 2016, 3 pages (w/English Translation).
Notice of Allowance received for Korean Patent Application No. 10-2017-7005770, dated Nov. 21, 2017, 3 pages (with English Translation).
Response to Korean Office Action filed on May 14, 2018, for Korean Patent Application No. 10-2018-7003798, dated Mar. 14, 2018, 13 pages (with English Translation).
Response to Notice of Allowance filed on Sep. 13, 2017, for U.S. Appl. No. 15/070,178, dated Jun. 13, 2017, 6 pages.
Response to Notice of Non-Compliant Amendment filed on Nov. 30, 2017, for U.S. Appl. No. 15/070,178, dated Oct. 13, 2017, 7 pages.
Voluntary Amendment filed for Canada Patent Application No. 2,931,531, dated Apr. 12, 2018, 10 pages.
Office Action received for Korean Patent Application No. 10-2017-7005770, dated Jul. 12, 2017, 13 pages (with English Translation).
Office Action received for Chinese Patent Application No. 201480073776.4, dated Dec. 1, 2016, 8 pages (with English Translation).
Response to Office Action filed on Apr. 12, 2017 for Chinese Patent Application No. 201480073776.4, dated Dec. 1, 2016, 9 pages (with English Claims).
Voluntary Amendment filed for Chinese Patent Application No. 201480073776.4 dated Oct. 9, 2016, 11 pages (w/ English Translation).
Response to Office Action filed on Sep. 8, 2017 for Korean Patent Application No. 10-2017-7005770, dated Jul. 12, 2017, 14 pages (with English Claims).
Communication Pursuant to Article 94(3) EPC received for European Patent Application No. 14867705.7, dated Jan. 30, 2018, 13 pages.
Response to Office Action filed on Oct. 21, 2016 for Korean Patent Application No. 10-2016-7017866, dated Aug. 24, 2016, 11 pages (with English Claims).
Voluntary Amendment filed for Chinese Patent Application No. 201710727479.2 dated Mar. 13, 2018, 12 pages (with English Claims).
Response to Non-Final Office Action filed on Sep. 8, 2016 for U.S. Appl. No. 15/070,178, dated Jun. 23, 2016, 11 pages.
Office Action received for Korean Patent Application No. 10-2018-7003798, dated Mar. 14, 2018, 5 Pages. (with English Translation).
Response to Communication Pursuant to Article 94(3) EPC filed on Mar. 7, 2018, for European Patent Application No. 14867705.7, dated Jan. 30, 2018, 12 pages.
Response to Communication Pursuant to Article 94(3) EPC filed on Nov. 17, 2017, for European Patent Application No. 14867705.7, dated Jul. 21, 2017, 14 pages.
Appeal Brief filed on Mar. 20, 2017, for U.S. Appl. No. 15/070,178, dated Jan. 12, 2017, 23 pages.
Applicant Initiated Interview Summary received for U.S. Appl. No. 15/070,178, dated Aug. 19, 2016, 3 pages.
Applicant Initiated Interview Summary received for U.S. Appl. No. 15/070,178, dated Nov. 22, 2016, 3 pages.
Final Office Action received for U.S. Appl. No. 15/070,178, dated Oct. 12, 2016, 9 pages.

(56) References Cited

OTHER PUBLICATIONS

Non-Final Office Action received for U.S. Appl. No. 15/070,178, dated Jun. 23, 2016, 7 pages.
Notice of Allowance received for U.S. Appl. No. 15/070,178, dated Jan. 5, 2018, 8 pages.
Notice of Allowance received for U.S. Appl. No. 15/070,178, dated Jun. 13, 2017, 14 pages.
Notice of Non-Compliant Amendment received for U.S. Appl. No. 15/070,178, dated Oct. 13, 2017, 2 pages.
Preliminary Amendment filed for U.S. Appl. No. 15/070,178, dated Mar. 31, 2016, 7 pages.
Communication Pursuant to Article 94(3) EPC received for European Patent Application No. 14867705.7, dated May 31, 2018, 8 pages.
Canadian Application Serial No. 2,931,531, Office Action dated Jun. 15, 2018, 3 pages.
U.S. Appl. No. 15/070,178, Decision on Pre-Appeal Brief Request mailed Feb. 10, 2017, 2 pages.
U.S. Appl. No. 15/070,178, Pre-Appeal Brief filed Jan. 12, 2017, 5 pages.

\* cited by examiner

METHODS, SYSTEMS, AND APPARATUS FOR A GEO-FENCE SYSTEM

PRIORITY

This application is a continuation of U.S. patent application Ser. No. 15/070,178, filed Mar. 15, 2016, which is a continuation of U.S. patent application Ser. No. 14/098,111, filed on Dec. 5, 2013, each of which is hereby incorporated by reference herein in its entirety.

TECHNICAL FIELD

The present application relates generally to mobile device communications, and more specifically, in one example, to generating and detecting geo-fences.

BACKGROUND

A variety of mobile devices, including mobile phones, personal digital assistants (PDA's), wearable computing devices (e.g., smartwatches) and the like, offer users the ability to communicate while in motion. The mobile devices may provide computing capabilities; communication applications such as electronic mail, text messaging, voice communications and the like; and internet browsing capabilities. In addition, mobile devices may receive notifications from web servers and other servers that may be displayed to the user of the mobile device. For example, a bank may send a notification regarding a bank deposit to a user and a restaurant may send an advertisement or discount coupon to a customer or a potential customer.

In order to focus the notification on the most promising customers, an entity, such as a restaurant, may establish a geo-fence that determines which users may receive the notification. For example, only users that enter the defined area encompassed by the geo-fence boundary may receive the notification. The geo-fence may be defined in a variety of configurations, such as a circular area defined by a radius around the location of the restaurant, and may be based, for example, on longitude and latitude coordinates.

BRIEF DESCRIPTION OF THE DRAWINGS

Some embodiments are illustrated by way of example and not limitation in the figures of the accompanying drawings in which.

DETAILED DESCRIPTION

Figure 1:
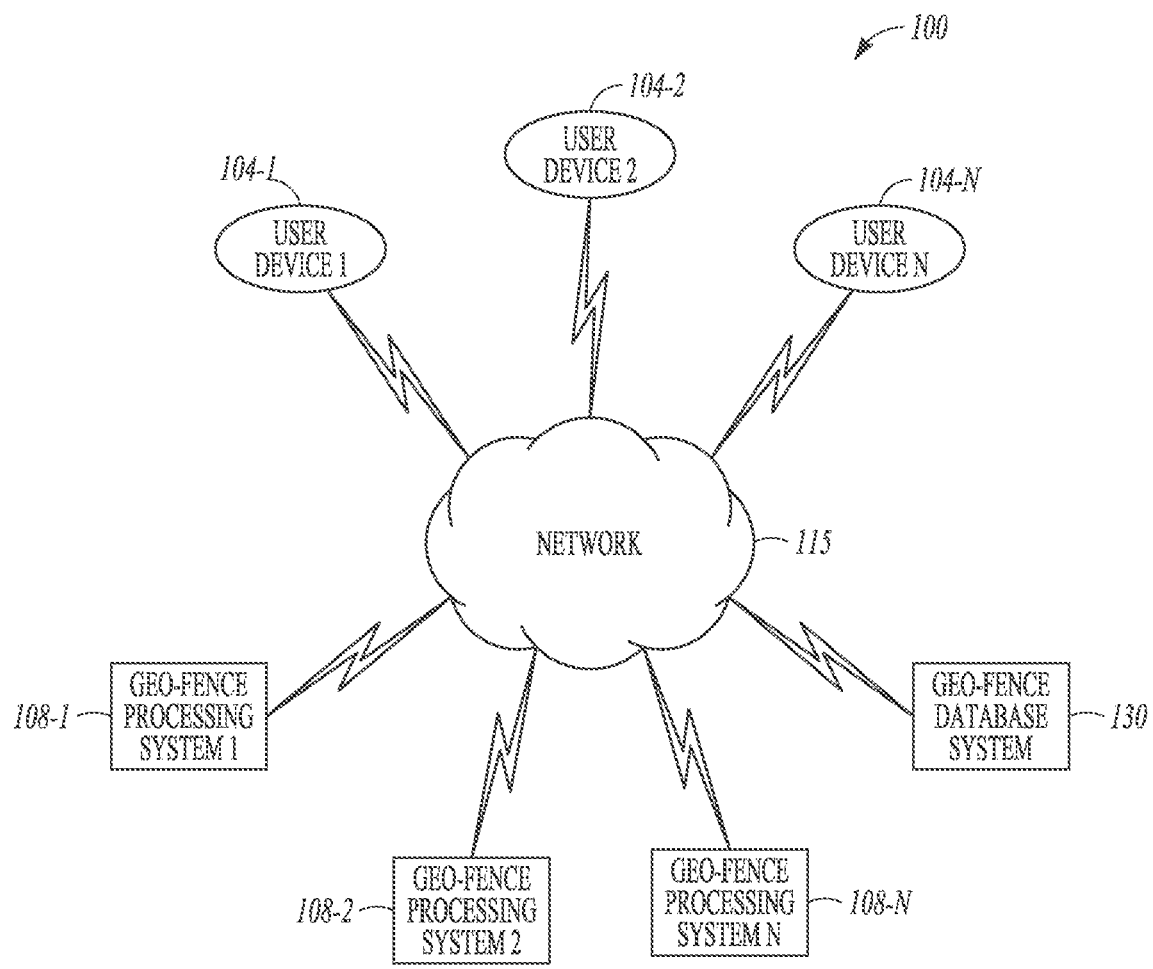
FIG. 1 is a block diagram of an example system for defining and utilizing a geo-fence, in accordance with an example embodiment.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention; and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, systems, and apparatus for defining, generating, utilizing, and/or detecting a geo-fence are described. According to Wikipedia, a Geo-fence is a virtual perimeter for a real-world geographic area. The geo-fence may define an area where, for example, a user of a mobile device may receive a communication. The communication may be a notification, a text message, electronic mail, a tweet, and the like. In one example embodiment, a mobile device may only be sent a communication when the mobile device enters and/or resides in the area encompassed by the geo-fence. In one example embodiment, a mobile device may only receive a communication when the mobile device enters or resides in the area encompassed by the geo-fence and/or may only process a communication when the mobile device enters and/or resides in the area encompassed by the geo-fence.

Geo-Fence Generator Techniques

In one example embodiment, a geo-fence may be dynamically generated and/or modified. The geo-fence may be dynamically generated and/or modified based on various criteria, such as contextual information, user behavior, user history, a density of geo-fences, a number of applications that utilize geo-fences, an amount of storage on a mobile device, and the like. A trigger based on the defined criteria may initiate a generation or modification of a geo-fence. A geo-fence generation technique may comprise a geo-fence criteria, one or more triggers, and a boundary definition formula. Various geo-fence techniques include, but are not limited to:

Human Population

In one example embodiment, a geo-fence may be defined based on a density of the human population. For example, a restaurant located in a more densely populated area of people may define a geo-fence surrounding a smaller geographic area than a restaurant located in a less densely populated area. The geo-fence may be defined by:

Criteria: human population and/or density of human population.

Triggers: i) a percentage change in human population exceeding a threshold; 2) the human population being within a defined population range; 3) a percentage change in the density of the human population exceeding a threshold; and 4) a density of human population being within a defined density range.

Boundary Definition: 1) a circle with a center located at a selected locale and a radius proportional to the selected criteria.

Establishments

In one example embodiment, a geo-fence may be defined based on a density of similar establishments. For example, a restaurant located in a more densely populated area of restaurants may define a geo-fence surrounding a smaller geographic area than a restaurant located in a less densely populated area of restaurants. The geo-fence may be defined, for example, by:

Criteria: density of establishments and/or a count of establishments (may include only establishments of a similar type).

Triggers: 1) a percentage change in a count of establishments exceeding a threshold; 2) a count of establishments being within a defined range; 3) a percentage change in a density of establishments exceeding a threshold; and 4) a density of establishments being within a defined density range.

Boundary Definition: 1) a circle with a center located at a selected locale and a radius proportional to the selected criteria.

Density of Electronic Commerce Listings

In one example embodiment, a geo-fence may be defined based on a density of electronic commerce listings. For example, a used car lot located in an area corresponding to a large number of listings for used automobiles may define a geo-fence surrounding a smaller geographic area than a used car lot located in an area corresponding to a smaller number of listings for used automobiles. The geo-fence may be defined by:

Criteria: density of electronic commerce listings and/or a count of electronic commerce listings (may include only electronic commerce listings of a similar type).

Triggers: 1) a percentage change in a count of electronic commerce listings exceeding a threshold; 2) a count of electronic commerce listings being within a defined range; 3) a percentage change in a density of electronic commerce listings exceeding a threshold; and 4) a density of electronic commerce listings being within a defined density range.

Boundary Definition: 1) a circle with a center located at a selected locale and a radius proportional to the selected criteria.

Density of Geo-Fences

In one example embodiment, a geo-fence may be defined based on a local density of geo-fences. For example, in order to prevent a mobile device from being overloaded with notifications, a geo-fence in a locale with a high density of geo-fences may encompass a smaller area than a geo-fence in a locale with a low density of geo-fences. The geo-fence may be defined by:

Criteria: density of geo-fences and/or a count of geo-fences.

Triggers: 1) a percentage change in a count of geo-fences exceeding a threshold; 2) a count of geo-fences being within a defined range; 3) a percentage change in a density of geo-fences exceeding a threshold; and 4) a density geo-fences being within a defined density range.

Boundary Definition: 1) a circle with a center located at a selected locale and a radius proportional to the selected criteria.

Item Value

In one example embodiment, a geo-fence may be defined based on a value of an item. For example, an item listed for sale with a higher value may be associated with a geo-fence surrounding a larger geographic area than an item listed for sale with a higher value. A yacht valued at $700,000 may be associated with a geo-fence surrounding a larger geographic area than a sailboat valued at $3,500.

The geo-fence may be defined by:

Criteria: an item value.

Triggers: 1) an item value being within a defined range; and 2) a percentage change in an item value exceeding a threshold.

Boundary Definition: 1) a circle with a center located at a selected locale and a radius proportional to the selected criteria.

Item Popularity

In one example embodiment, a geo-fence may be defined based on a popularity of an item. For example, an item listed for sale that is very popular may be associated with a geo-fence surrounding a smaller geographic area than an item listed for sale that is not very popular. The popularity of an item may be measured based on one or more of a number of online searches for the item, a number of online views of an item, a number of sales of the item, and the like. The geo-fence may be defined by:

Criteria: a popularity of an item based on a number of online searches for the item, a number of online views of an item, and/or a number of sales of the item.

Triggers: 1) a popularity of an item being within a defined range; and 2) a percentage change in a popularity of an item exceeding a threshold.

Boundary Definition: 1) a circle with a center located at a selected locale and a radius proportional to the selected criteria.

Item Characteristics

In one example embodiment, a geo-fence may be defined based on one or more item characteristics, such as the size of an item, a weight of an item, a shipping cost for an item, and the like. For example, a geo-fence may be defined by a seller of an item based on shipping and/or delivery costs and/or based on the size and/or weight of the item. The geo-fence may encompass an area served by a particular delivery company. The geo-fence may be defined by:

Criteria: one or more item characteristics.

Triggers: i) an item characteristic being within a defined range; and 2) a percentage change in an item characteristic exceeding a threshold.

Boundary Definition: 1) a circle with a center located at a selected locale and a radius proportional to the selected criteria; 2) an area served by one or more delivery companies; and 3) an area served by one or more delivery companies that can accommodate the selected item characteristic.

Demographics

In one example embodiment, a geo-fence may be defined based on the demographics of a population. For example, a geo-fence may be defined for a daycare center that encompasses an area where families are located. The geo-fence may encompass the daycare center, or the area defined by the geo-fence may exclude the location of the daycare center and simply encompass an area where families are located. The geo-fence may be defined by:

Criteria: demographics of human population.

Triggers: reception of new demographic information.

Boundary Definition: 1) an area where a selected demographic exceeds a threshold value.

Travel Time

In one example embodiment, a geo-fence may be defined based on travel time. For example, a geo-fence may be defined encompassing an area where the travel time to a restaurant is 30 minutes or less. The geo-fence may, for example, encompass major highway corridors. The geo-fence may be defined by:
Criteria: travel time.
Triggers: 1) traffic congestion; 2) roadway construction; and 3) mass transit congestion.
Boundary Definition: 1) an area where a travel time to a selected location is less than a threshold travel time.
User Characteristic In one example embodiment, a geo-fence may be defined based on user behavior and history. For example, a geo-fence for a seller with a strong track record may be granted a larger geo-fence area than a seller with a weak track record. In one example embodiment, an area of a geo-fence for a seller with a strong track record may be expanded and/or an area of a geo-fence for a seller with a weak track record may be reduced. In one example embodiment, an area of a geo-fence for a seller with a weak track record may be defined to match a geo-fence of a seller with a strong track record. The geo-fence may be defined by:
Criteria: characteristics of a user, such as seller track record.
Triggers: reception of revised user characteristics.
Boundary Definition: 1) a circle with a center located at a selected locale and a radius proportional to the selected criteria.
User Travel In one example embodiment, a geo-fence may be defined based on where a user is traveling. For example, a geo-fence may be established around an airport for a time period beginning when a traveler is expected to arrive at an airport. The geo-fence may be used, for example, to alert the traveler to accommodations and restaurants near the airport or near locations on the traveler's itinerary. The geo-fence may be relocated based on the traveler's itinerary. For example, the geo-fence may be moved and established around a hotel where the traveler has a hotel reservation.
Criteria: Itinerary of a user.
Triggers: 1) reception of a new itinerary; and 2) changes to an existing itinerary.
Time of Day In one example embodiment, a geo-fence or a plurality of geo-fences may be activated and deactivated based on a time of day. For example, a restaurant may notice that senior customers eat at a particular time of day and may activate a geo-fence during this time period. The geo-fence may be defined by:
Criteria: a time of day, such as a defined time period.
Triggers: defined time-of-day alarm.
Boundary Definition: Defined by an associated geo-fence generator technique.
Combination of Techniques In one example embodiment, a plurality of techniques may be used to define a geo-fence. For example, a restaurant may notice that senior customers eat at a different time of day than college students and may, therefore, define a geo-fence for senior customers during a first time period and encompassing an area with a high concentration of seniors, and another geo-fence for college students during a second time period and encompassing an area with a high concentration of college students. The first time period and the second time period may overlap in time and space.

In one example embodiment, a plurality of geo-fences may be defined. One geo-fence may partially overlap or completely overlap another geo-fence. For example, a different geo-fence may be defined for each demographic of an area. In one example embodiment, a retailer may notice that senior customers may be only willing to travel a shorter distance than college students and may, therefore, define different geo-fences for senior customers and college students.
Client-Side Geo-Fence Modifications In one example embodiment, a geo-fence may be processed differently based on an availability of storage on a mobile device. For example, in order to prevent a mobile device from being overloaded with notifications when a mobile device with a small amount of available storage crosses a boundary of geo-fence, the mobile device may delay recognizing the geo-fence until the mobile device is closer to the center of the area defined by the geo-fence or may completely ignore the geo-fence.

In one example embodiment, a geo-fence may be processed differently based on a number of applications that utilize geo-fences on a particular mobile device or on a plurality of mobile devices. For example, in order to prevent a mobile device from being overloaded with notifications, a geo-fence may be processed differently when a mobile device or a plurality of mobile devices are executing a large number of applications (that are actively utilizing geo-fences) may encompass a smaller area than a geo-fence when a mobile device or a plurality of mobile devices comprise a small number of applications (that utilize geo-fences). In one example embodiment, a mobile device comprising a large number of applications that are actively utilizing geo-fences may alter the boundaries of the geo-fence that are recognized by the mobile device. For example, when a mobile device crosses a boundary of a geo-fence, the mobile device may delay recognizing the geo-fence until the mobile device is closer to the center of the area defined by the geo-fence.

FIG. 1 is a block diagram of an example system 100 for defining and utilizing a geo-fence, in accordance with an example embodiment. In one example embodiment, the system 100 may include one or more user devices 104-1, 104-2 and 104-N (known as user devices 104 hereinafter), one or more geo-fence processing systems 108-1, 108-2 and 108-N (known as geo-fence processing systems 108 hereinafter), a geo-fence database system 130, and a network 115. Each user device (e.g., 104-1) may be a personal computer (PC), a tablet computer, a mobile phone, a personal digital assistant (PDA), a wearable computing device (e.g., a smartwatch), or any other appropriate computer device. Each user device (104-1, 104-2 or 104-N) may include a user interface module, described more fully below in conjunction with FIG. 2. In one embodiment, the user interface module may include a web browser program and/or an application, such as a mobile application. In one embodiment, the user device 104-1 may include a geo-fence generator module to generate, detect, process and/or utilize geo-fences and/or locally modify a geo-fence, as described more fully below in conjunction with FIGS. 2-4. Although a detailed description is only illustrated for user device 104-1, it is noted that each of the other user devices (e.g., user device 104-2 through user device 104-N) may have corresponding elements with the same functionality.

The geo-fence processing systems 108 may be a server, client, or other processing device that includes an operating system for executing software instructions. The geo-fence processing systems 108 may provide, generate and/or modify a geo-fence based on parameters provided by a user via, for example, the user device 104-1 and/or may generate and/or modify a geo-fence automatically based on predefined criteria.

The geo-fence database system 130 may maintain the definition of one or more geo-fences. The geo-fence database system 130 may comprise information used for defining a geo-fence, such as electronic commerce item listings and historical records, client device information, demographic information, and the like.

The network 115 may be may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, a network of interconnected networks, or a combination of two or more such networks, and the like.

Figure 2:
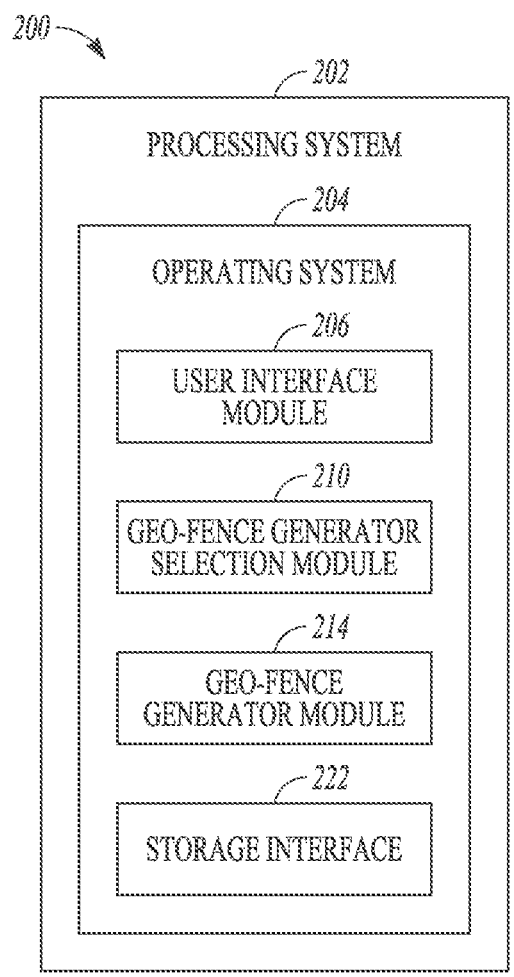
FIG. 2 is a block diagram of an example apparatus for defining and utilizing a geo-fence, in accordance with an example embodiment.

FIG. 2 is a block diagram of an example apparatus 200 for defining and utilizing a geo-fence, in accordance with an example embodiment. The apparatus 200 is shown to include a processing system 202 that may be implemented on a client or other processing device that includes an operating system 204 for executing software instructions.

In accordance with an example embodiment, the apparatus 200 may include a user interface module 206, a geo-fence generator selection module 210, and one or more geo-fence generator modules 214. In accordance with an example embodiment, the apparatus 200 may further include a storage interface 222.

The user interface module 206 may enable a user to define, establish, and/or activate a geo-fence. The user interface module 206 may enable a user to select a geo-fence generator technique for defining the geo-fence and may enable a user to enter a locale for the geo-fence.

The geo-fence generator selection module 210 may select the geo-fence generator technique for defining a geo-fence. The method selection may be based on a user selection and/or may be automatically selected based on predefined criteria.

The one or more geo-fence generator modules 214 may generate and/or establish a geo-fence. The definition of the geo-fence may include an indication of the boundaries of the geo-fence. The area encompassed by a geo-fence may include one or more locations associated with the geo-fence, such as the location of a commercial establishment, or may exclude one or more of the locations associated with the geo-fence. The one or more geo-fence generator modules 214 may activate a geo-fence and/or modify a geo-fence based on user commands and/or automatically based on predefined criteria.

Figure 3:
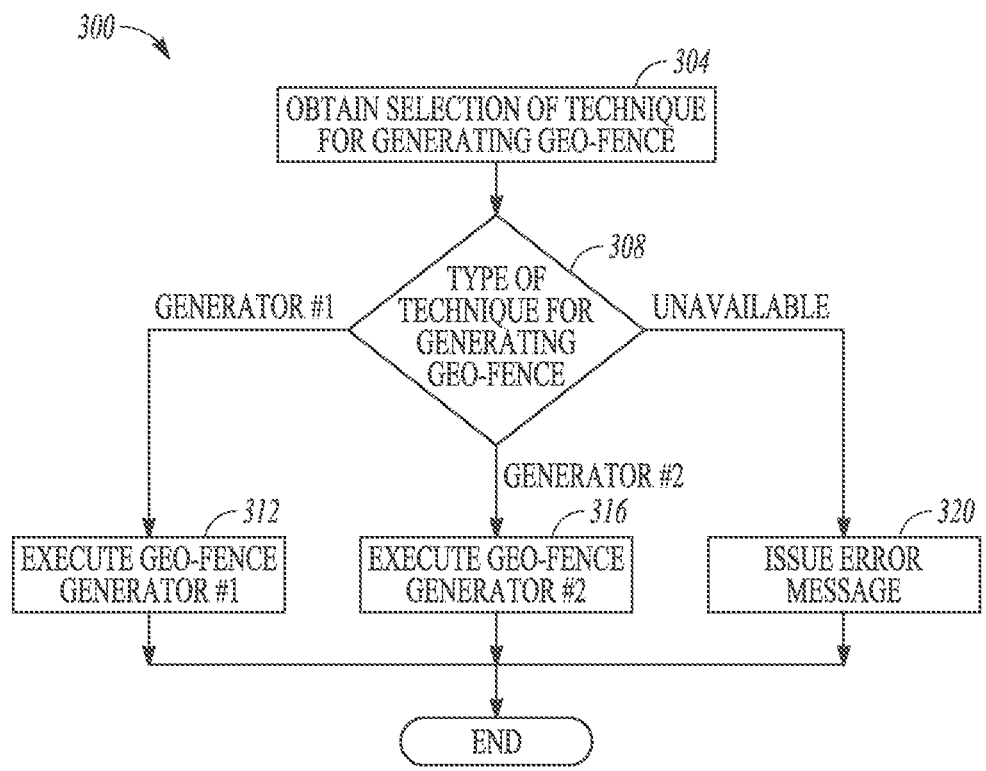
FIG. 3 is a flowchart for an example geo-fence generator selection method, in accordance with an example embodiment.

FIG. 3 is a flowchart for an example geo-fence generator selection method 300, in accordance with an example embodiment. The geo-fence generator selection method 300 may enable the selection of the method (i.e., geo-fence generator technique) for defining a geo-fence. The geo-fence generator selection method 300 may be based on a user selection and/or may be automatically selected based on predefined criteria. In one example embodiment, one or more of the operations of the geo-fence generator selection method 300 may be performed by the geo-fence generator selection module 210.

A selection of a geo-fence generator technique may be obtained (operation 304). In one example embodiment, a selection of a geo-fence generator technique and associated parameters may be obtained from a user. For example, a selection of a geo-fence generator technique and associated parameters may be obtained from a user via, for example, user device 104-1, as described more fully below in conjunction with FIGS. 5 and 6. In one example embodiment, a trigger(s), such as one or more of the triggers described more fully above, may occur that will invoke a geo-fence generator technique. In response to the trigger, one or more geo-fence generator methods corresponding to the trigger may be selected. For example, a change in demographic information may trigger the modification of a geo-fence based on a corresponding geo-fence generator method, such as the demographic generator technique and/or the time generator technique.

A test may be performed to determine the type of geo-fence generator method to execute (operation 308). For example, the selection obtained from a user may be compared to a list of available geo-fence generator techniques. If one of the available geo-fence generator techniques matches the obtained selection, then the geo-fence generator method corresponding to the selected technique may be executed (operations 312 and 316), otherwise, an error message may be returned indicating that the selected geo-fence generator method is not available (operation 320). The method may then end.

In one example embodiment, the geo-fence generator method may be automatically selected. For example, if a local density of geo-fences exceeds a threshold, e.g., 25 geo-fences per square mile, a geo-fence density method may be selected. The geo-fence density method may, for example, reduce the size of one or more geo-fences in the area where the geo-fence density exceeds 25 geo-fences per square mile.

Figure 4:
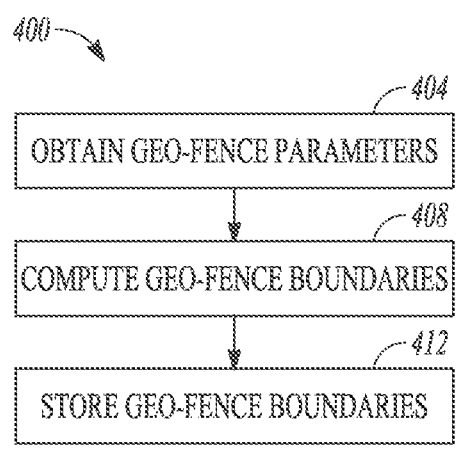
FIG. 4 is a flowchart for an example geo-fence generator method, in accordance with an example embodiment.

FIG. 4 is a flowchart for an example geo-fence generator method 400, in accordance with an example embodiment. The geo-fence generator method 400 may generate or modify a geo-fence and define, or redefine, the boundaries of the geo-fence. In one example embodiment, one or more of the operations of the geo-fence generator method 400 may be performed by the geo-fence generator module 214.

In one example embodiment, one or more parameters of the geo-fence to be generated may be obtained (operation 404). For example, one or more parameters of the geo-fence to be generated may be obtained from the user device 104-1. In one example embodiment, one or more parameters of the geo-fence, such as the locale of the geo-fence, may be obtained, for example, from the geo-fence generator selection module 210.

The boundaries of the geo-fence may be computed based on the obtained parameters (operation 408), as described more fully below. The computed geo-fence may or may not encompass the locale. In one example embodiment, the boundaries of a geo-fence may be a circle, a rectangle, an octagon, or any arbitrary shape.

The computed boundary of the geo-fence may be stored, for example, in the geo-fence database system 130 (operation 412). The method may then end.

Computation of the Geo-Fence Boundaries

As described above, each geo-fence generator method comprises a boundary definition formula. In one example embodiment, the geo-fence generator module 214 may derive the boundary based on the corresponding boundary definition formula. For example, if the boundary of the geo-fence is a circle, the obtained parameter, such as the selected criteria, may be multiplied by a multiplication factor to determine the radius of the circle that defines the geo-fence. If the geo-fence is based on the value of an item, the value of the item (e.g., $5,000) may be obtained and may be multiplied by a multiplication factor. If the geo-fence is based on a volume and/or weight of an item, the volume and/or weight (e.g., 5 kilograms) of the item may be obtained and may be multiplied by a multiplication factor. If the geo-fence is based on demographics, the target demographic of the geo-fence (e.g., 550 college students) may be obtained and may be multiplied by a multiplication factor.

For example, if the boundary of the geo-fence is a circle, the obtained parameter may be multiplied by a multiplication factor to determine the radius of the circle that defines the geo-fence. If the geo-fence is based on a listing density of a type of item, the listing density for the type of item may be obtained and may be multiplied by a multiplication factor. For example, the number of item listings corresponding to the obtained type of listing within a one-mile radius of the obtained locale may be obtained from the geo-fence database system 130 and may be multiplied by a multiplication factor. If the geo-fence is based on a popularity of an item, the popularity of the item (e.g., the percentage of a local population that has searched for the item) may be obtained and may be multiplied by a multiplication factor. If the geo-fence is based on a density of geo-fences, the density of geo-fences (e.g., geo-fences per square kilometer) may be obtained and may be multiplied by a multiplication factor. If the geo-fence is based on population density, the population density (e.g., people per square kilometer) may be obtained and may be multiplied by a multiplication factor. If the geo-fence is based on a user's behavior and/or history, the user's behavior and/or history (e.g., percentage of listed items that are sold) may be obtained and may be multiplied by a multiplication factor. The multiplication factor may be greater than one, may be equal to one, or may be less than one.

In one example embodiment, the boundary may be defined using externally generated data. For example, a map identifying the demographic population of different geographical areas may be used to generate a geo-fence based on demographics.

Figure 5:
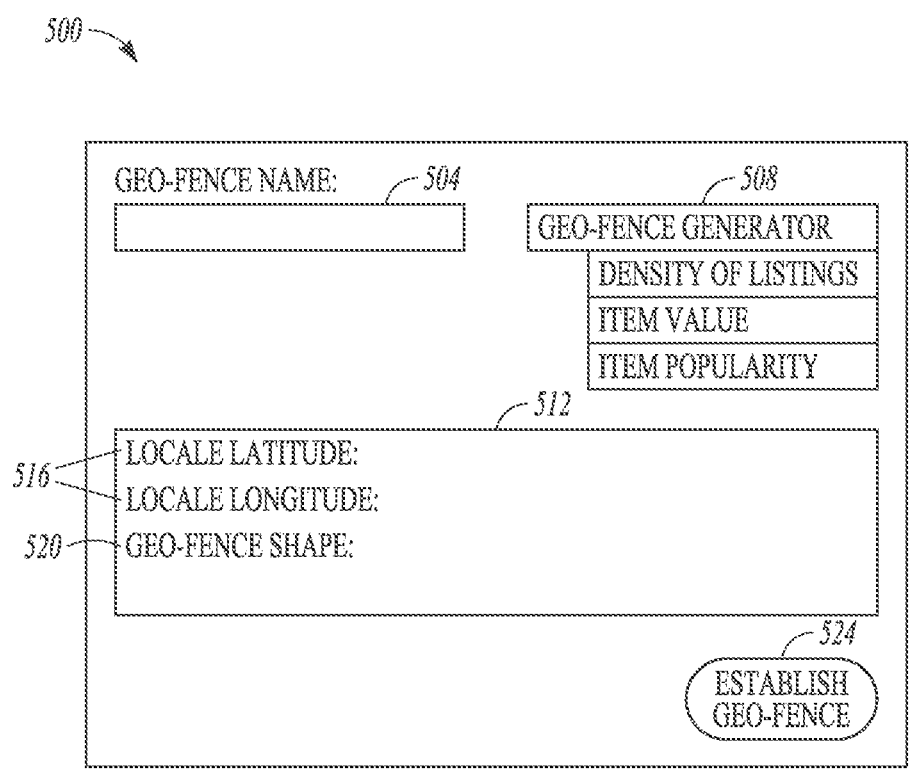
FIG. 5 is a representation of an example user interface for defining a geo-fence, in accordance with an example embodiment.

FIG. 5 is a representation of an example user interface 500 for defining a geo-fence, in accordance with an example embodiment. In one example embodiment, the user interface 500 may be utilized by user device 104-1 to enable a user to define and/or generate a geo-fence.

In one example embodiment, an identifier of a geo-fence, such as a geo-fence name, may be entered in a geo-fence identifier field 504 and a type of geo-fence generator method may be selected from a drop-down menu 508. In response to a selection of a type of geo-fence generator method, a parameter field area 512 may be displayed that corresponds to the selected type of geo-fence generator method. For example, as illustrated in FIG. 5, the parameter field area 512 may comprise a locale entry field 516 for entering the latitude and longitude coordinates of the locale for the geo-fence and may comprise a geo-fence shape entry field 520 for entering the shape of the geo-fence, e.g., a circle, a rectangle, or any arbitrary shape. The geo-fence may, for example, encompass a circular area centered at the coordinates defined in the locale entry field 516. The selected geo-fence may be generated and/or updated by selecting the "establish geo-fence" radio button 524.

Figure 6:
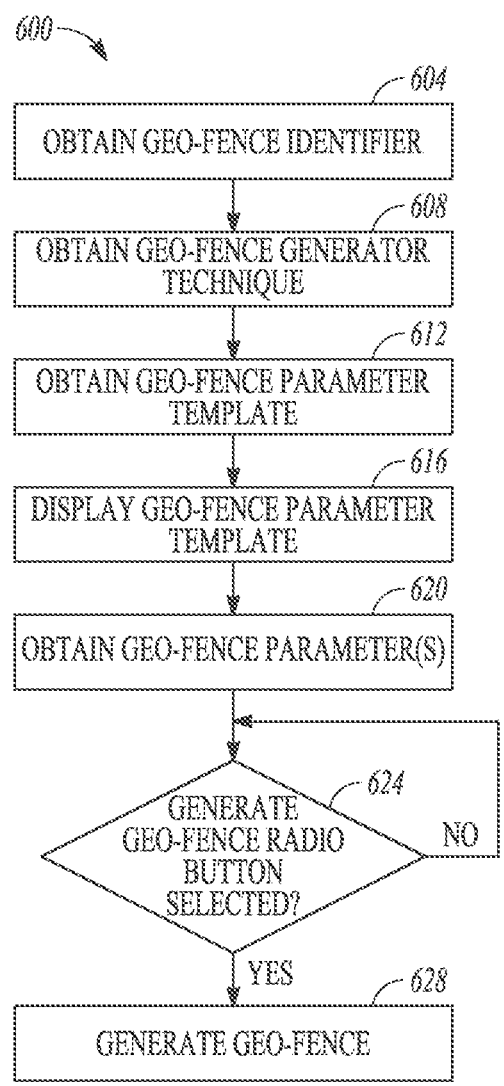
FIG. 6 is a flowchart for an example user interface method for defining a geo-fence, in accordance with an example embodiment.

FIG. 6 is a flowchart for an example user interface method 600 for defining a geo-fence, in accordance with an example embodiment. In one example embodiment, one or more of the operations of the user interface method 600 may be performed by the user interface module 206.

In one example embodiment, an identifier of a geo-fence, such as a geo-fence name, may be obtained via the geo-fence identifier field 504 (operation 604) and a selection of a type of geo-fence generator method may be obtained from the drop-down menu 508 (operation 608). A parameter field template corresponding to the obtained geo-fence generator method selection may be obtained (operation 612). For example, a parameter field template may be obtained from a local template table and/or may be obtained from the geo-fence database system 130. The obtained parameter field template may be displayed in the parameter field area 512, as illustrated in FIG. 5 (operation 616).

One or more parameters entered by a user in the parameter field area 512 may be obtained (operation 620). For example, the latitude and longitude coordinates of the locale for the geo-fence may be obtained. A test may be performed to determine if the "establish geo-fence" radio button 524 was selected (operation 624). If the "establish geo-fence" radio button 524 was selected, the obtained parameters may be passed to the geo-fence generator module 214 corresponding to the selected geo-fence generator technique (operation 628). The method may then end.

Although certain examples are shown and described here, other variations exist and are within the scope of the invention. It will be appreciated by those of ordinary skill in the art that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 115 (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
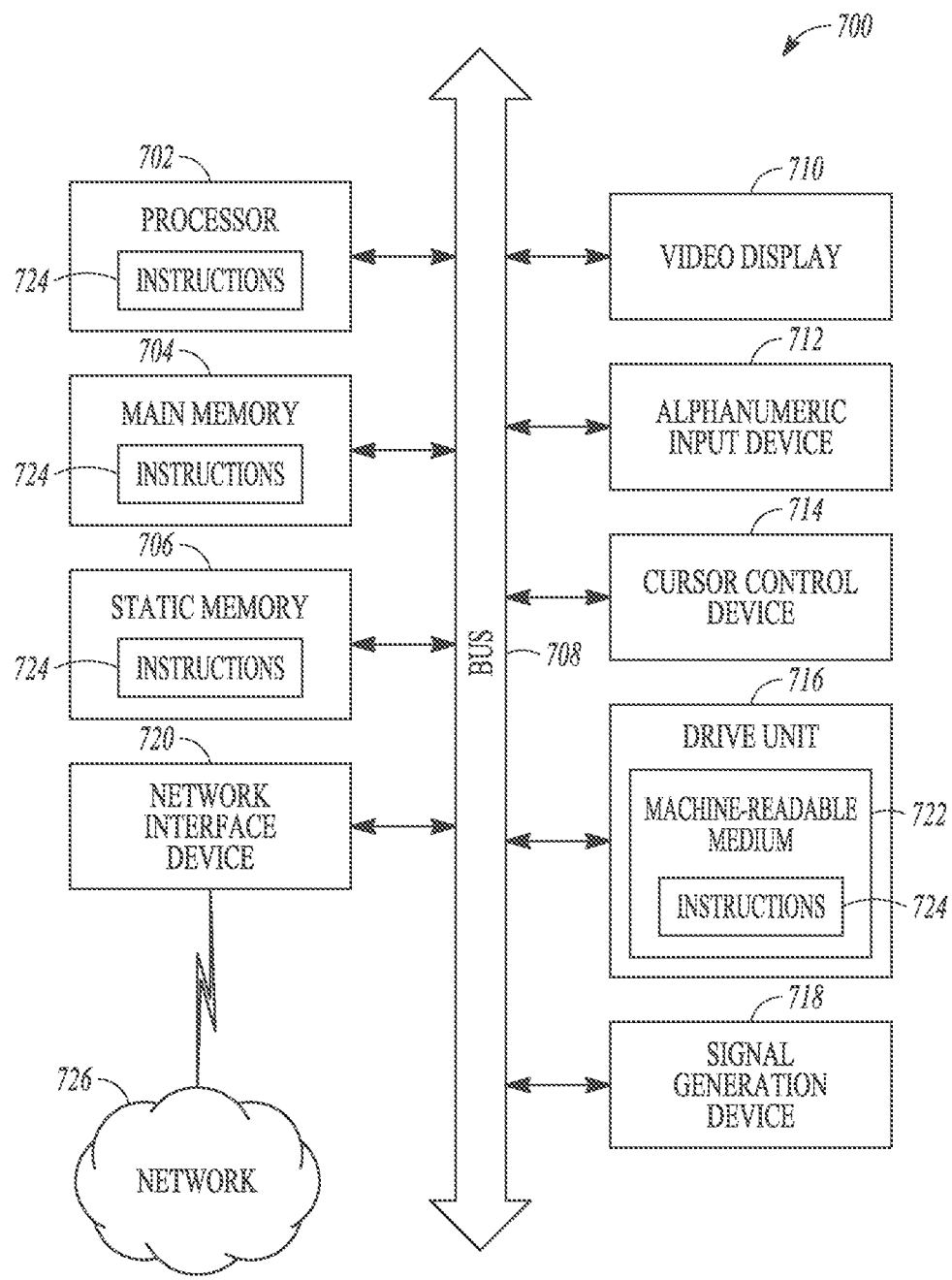
FIG. 7 is a block diagram of a machine within which instructions may be executed for causing the machine to perform any one or more of the methodologies discussed herein.

FIG. 7 is a block diagram of a machine within which instructions may be executed for causing the machine to perform any one or more of the methodologies discussed herein. In one example embodiment, the machine may be the example apparatus 200 of FIG. 2 for defining and utilizing a geo-fence. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device (cursor control device) 714 (e.g., a mouse), a disk drive unit 716, a signal generation device 718 (e.g., a speaker) and a network interface device 720.

Machine-Readable Medium

The drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. Instructions 724 may also reside within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures 724. The term "machine-readable medium" shall also be taken to include any tangible medium that is capable of storing, encoding or carrying instructions 724 for execution by the machine and that cause the machine to perform any one or more of the methodologies of the present invention, or that is capable of storing, encoding or carrying data structures utilized by or associated with such instructions 724. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
    a processor; and
    memory to store instructions that, when executed by the processor, cause the processor to perform operations comprising:
    obtaining a definition of a geo-fence, the geo-fence having a shape based on a population demographic, the geo-fence being defined based on a first geo-fence criterion of a plurality of geo-fence criteria, the plurality of geo-fence criteria includes at least one of: human population, a value of an item for sale, a travel time, or time of day;
    obtaining a trigger generated in response to a change in the first geo-fence criterion; and
    redefining one or more boundaries of the geo-fence based on the changed first geo-fence criterion in response to obtaining the trigger, the one or more boundaries being modified based on a change in a value of the first geo-fence criterion.

2. The apparatus of claim 1, wherein e redefining modifies one or more existing geo-fence boundaries.

3. The apparatus of claim 1, wherein the trigger is one or more of:
    a density of electronic commerce listings being within a defined listing density range;

a density of geo-fences being within a defined geo-fence density range;
a reception of revised demographic information;
a reception of revised user characteristics; or
a time-of-day alarm.

4. The apparatus of claim 1, wherein the plurality of geo-fence criteria further includes:
a density of human population;
a density of establishments;
a count of establishments;
a density of electronic commerce listings;
a count of electronic commerce listings;
one or more characteristics of the item for sale;
a popularity of an item for sale based on a number of online searches for the item;
a popularity of the item for sale based on a number of online views of an item;
a popularity of the item for sale based on a number of sales of the item;
demographics of human population;
one or more characteristics of a user; or
an itinerary of the user.

5. The apparatus of claim 1, wherein the redefining is based on an amount of storage on a geo-fence device.

6. The apparatus of claim 1, wherein a shape of the geo-fence is a circle and a radius of the circle is based on the first geo-fence criterion.

7. The apparatus of claim 1, wherein the geo-fence is activated at a first specified time of day and is deactivated at a second specified time of day.

8. A method comprising:
obtaining a definition of a geo-fence, the geo-fence having a shape based on a population demographic, the geo-fence being defined based on a first geofence criterion of a plurality of geo-fence criteria, the plurality of geo-fence criteria includes at least one of: human population, a value of an item for sale, a travel time, or time of day,
obtaining a trigger generated in response to a change in the first geo-fence criterion; and redefining one or more boundaries of the geo-fence based on the changed first geo-fence criterion in response to obtaining the trigger, the one or more boundaries being modified based on a change in a value of the first geo-fence criterion.

9. The method of claim 8, wherein the redefining modifies one or more existing geo-fence boundaries.

10. The method of claim 8, wherein the trigger is one or more of:
a density of electronic commerce listings being within a defined listing density range;
a density of geo-fences being within a defined geo-fence density range;
a reception of revised demographic information;
a reception of revised user characteristics; or
a time-of-day alarm.

11. The method of claim 8, wherein the redefining is based on an amount of storage on a geo-fence device.

12. The method of claim 8, wherein a shape of the geo-fence is a circle and a radius of the circle is based on the first geo-fence criterion.

13. The method of claim 8, wherein the geo-fence is activated at a start of a specified period of time and is deactivated at an end of the specified period of time.

14. A non-transitory computer-readable medium embodying instructions that, when executed by a processor, cause the processor to perform operations comprising:
obtaining a definition of a geo-fence, the geo-fence having a shape based on a population demographic, the geo-fence being defined based on a first geofence criterion of a plurality of geo-fence criteria, the plurality of geo-fence criteria includes at least one of: human population, a value of an item for sale, a travel time, or time of day;
obtaining a trigger, the trigger generated in response to a change in the first geo-fence criterion, and
redefining one or more boundaries of the geo-fence based on the changed first geo-fence criterion in response to obtaining the trigger, the one or more boundaries being modified based on a change in a value of the first, geo-fence criterion.

15. The non-transitory computer-readable medium of claim 14, wherein the redefining modifies one or more existing geo-fence boundaries.

16. The non-transitory computer-readable medium of claim 14, wherein the redefining is based on an amount of storage on a geo-fence device.

17. The non-transitory computer-readable medium of claim 14, wherein the geo-fence is activated at a start, of a specified period of time and is deactivated at an end of the specified period of time.

* * * * *